United States Patent
Briggs (10) Patent No.: US 9,307,669 B1
(45) Date of Patent: Apr. 5, 2016

(54) ADJUSTABLE SHELVING MOUNT WITH CORD ORGANIZER

(71) Applicant: Jeffrey D. Briggs, Lewiston, ME (US)

(72) Inventor: Jeffrey D. Briggs, Lewiston, ME (US)

(*) Notice: Subject to any disclaimer, the term of this patent is extended or adjusted under 35 U.S.C. 154(b) by 414 days.

(21) Appl. No.: 13/758,436

(22) Filed: Feb. 4, 2013

(51) Int. Cl.
*H05K 7/14* (2006.01)
*A47F 5/13* (2006.01)

(52) U.S. Cl.
CPC ............. *H05K 7/1492* (2013.01); *A47F 5/13* (2013.01)

(58) Field of Classification Search
CPC ........... Y10S 248/917; Y10S 248/918; Y10S 248/919; Y10S 248/924; A47B 81/06; A47B 81/061; H05K 7/1492; A47F 5/13
USPC .................................................. 248/917–924
See application file for complete search history.

(56) References Cited

U.S. PATENT DOCUMENTS

| | | | |
|---|---|---|---|
| 5,833,332 A * | 11/1998 | Marshall et al. | 312/223.3 |
| 5,934,636 A * | 8/1999 | Cyrell | 248/246 |
| 5,994,644 A * | 11/1999 | Rindoks et al. | 174/495 |
| 6,394,404 B1 * | 5/2002 | Cyrell | 248/345 |
| 6,905,101 B1 * | 6/2005 | Dittmer | 248/274.1 |
| 7,195,213 B2 | 3/2007 | Weatherly | |
| D567,545 S | 4/2008 | Liu | |
| D591,089 S | 4/2009 | Sexton | |
| 7,530,538 B2 | 5/2009 | Whalen et al. | |
| 7,676,992 B2 * | 3/2010 | Burns | 52/36.6 |
| D618,015 S | 6/2010 | Sexton | |
| 8,079,311 B2 | 12/2011 | Whalen et al. | |
| 2004/0129660 A1 * | 7/2004 | Kita | 211/180 |
| 2004/0188573 A1 * | 9/2004 | Weatherly | 248/125.1 |
| 2004/0188574 A1 * | 9/2004 | Weatherly et al. | 248/161 |
| 2005/0236530 A1 * | 10/2005 | Weatherly et al. | 248/122.1 |
| 2008/0239640 A1 * | 10/2008 | Park | 361/681 |
| 2009/0126750 A1 | 5/2009 | Pellereau | |
| 2010/0193455 A1 * | 8/2010 | Russell et al. | 211/90.02 |
| 2011/0198461 A1 | 8/2011 | Truckor | |

* cited by examiner

*Primary Examiner* — Patrick Hawn
(74) *Attorney, Agent, or Firm* — Robert C. Montgomery; Montgomery Patent and Design, LLC (57) ABSTRACT

An adjustable shelving mount with cord organizer that enables mounting a television and other audio/visual equipment. The adjustable shelving mount includes a spine that is routed down from the television to a power outlet level. The spine supports modular attachment of illuminated shelving units and includes electrical connectors and provides an internal wiring channel for discreetly routing various interconnecting cables and power cords. The shelves are supported upon brackets which attach to the spine. Multiple spine sections can attach together to provide enhanced configurability.

18 Claims, 9 Drawing Sheets

ADJUSTABLE SHELVING MOUNT WITH CORD ORGANIZER

RELATED APPLICATIONS

Not applicable.

FIELD OF THE INVENTION

The presently disclosed subject matter is directed toward home shelving units. More particularly, the present invention is directed toward home electronic shelving units with internal wiring channels and electrical connectors.

BACKGROUND OF THE INVENTION

American consumers have a wide range of high-tech products available for their entertainment. As has been shown numerous times, they are ever eager for increasingly sophisticated technological advancements. However, over the years the television has remained a primary staple for consumer entertainment.

While televisions have been widely available for decades they have evolved from very heavy, large consoles having small black-and-white screens, to larger, lightweight high-tech products having flat, thin screens with high density color elements and high tech operations. Unlike in the past, modern televisions are often hung on walls. While a wall mount can be very convenient, even the highest tech television still requires power cords and antenna (cable) connections. Such power cords and cable connections are often distracting and unsightly and mounting a television on a wall simply compounds those issues. Furthermore, televisions traditionally have been located as part of an "entertainment center," a spatial location where not only a television but DVD players, Blue-ray players, satellite receivers, cable boxes, gaming consoles, stereos systems and other entertainment devices are located and interconnected. But, since flat screen televisions are often wall mounted the traditional entertainment centers become less purposeful.

As with televisions, a major problem with most high-tech products is that usually each requires at least its own power cord and possibly associated wires such as speaker wires as well as a shelf. This expansion of devices, wires, power cords, and shelves can be very unattractive, exposing wires and cables which can become trip and fire hazards. In addition the number of required power outlets can easily exceed those available and the required shelving can be very expensive. Then there is the problem of simply routing power and signal cables.

Accordingly, there exists a need for a home entertainment shelving system which readily mounts flat screen televisions on walls while also supporting associated electronic devices such as DVD players, Blu-Ray™ players, satellite receivers, cable boxes, gaming consoles, stereos systems near the television. Preferably such a shelving system would support associated electronic devices immediately below or at least in the vicinity of the television, would save valuable floor space, would keep the resulting entertainment system looking neat and orderly, and would be highly configurable to enable a range of different configurations. Preferably such a shelving system would enable supporting shelves at different heights while allowing a flat screen television to be attached to wall studs to provide secure mounting. Even more preferably the shelving system would enable mounting many different makes and models of televisions while also enabling adjustable viewing angle. In practice it would be useful to provide illumination for the various devices on the shelves, it would be easy to use, would incorporate electrical power distribution using power outlets, and would hide the various signal and power wires of the devices of the entertainment center.

SUMMARY OF THE INVENTION

The principles of the present invention provide for a shelving system for flat screen televisions mounted on walls. The shelving system further supports associated electronic devices such as DVD players, Blu-Ray™ players, satellite receivers, cable boxes, gaming consoles, stereos systems near the television. The shelving system supports associated electronic devices below the television and keeps wiring such as power cords, cables, and speaker wires organized and hidden. The inventive shelving system supports shelves at different heights while enabling adjustable viewing angles for the television.

A shelving assembly that is in accord with the principles of the present invention includes a television mount having a front plate with a plurality of front plate apertures, a front hinge attached to the back of the front plate, an extension arm that is pivotally connected to the front hinge, a rear hinge that is pivotally connected to the extension arm, and a rear plate that is connected to the rear hinge. The rear plate includes at least one rear plate aperture for assisting mounting on a wall. The shelving assembly further includes a spine assembly having a "U"-shaped frame that defines a back plate and two (2) closures that define two (2) frame sidewalls. The spine assembly further includes a "U"-shaped mating cover having an internal electrical power strip for distributing electrical power. The spine assembly defines an interior channel, each defined sidewall includes female slots, the power strip includes an electrical outlet, and the mating cover includes an aperture for enabling access to the electrical outlet. The shelving assembly further includes a shelf assembly having a shelf panel and at least a first shelf support bracket with male tabs for mating the shelf assembly to the spine assembly and for supporting the shelf panel. The front hinge enables side-to-side adjustment of said the arm.

In practice, the front plate apertures are configured to receive fasteners that retain the front plate to a television. The frame closures each have an interior surface with frame grooves while the mating cover includes two (2) frame sidewalls having mating grooves. The spine cover and frame friction fit together such that the frame grooves and the mating grooves interlock. Beneficially the frame sidewalls include a plurality of perforated knock-outs.

Beneficially the power strip provides reduced voltage via a plurality of low-voltage outlets, wherein at least one (1) low-voltage outlet is a female connector. Preferably the power strip includes power input pins for receiving electrical power and power outlet pins for mating with power input pins of another power strip such that a plurality of power strips can be connected together. Thus it is beneficial if the power outlet pins and power input pins are aligned to enable forming an extended linear assembly. In practice the power strip should include at least one (1) standard 110-volt outlet plug.

The frame back plate preferably includes at least one (1) frame aperture configured to enable mount the spine assembly to a wall.

The shelf assembly may include a plurality of lights. If so it is beneficial that the shelf panel is transparent and the plurality of lights is configured to attach to the shelf panel such that emitted light passes through the shelf panel. Preferably the lights are light-emitting diodes whose illumination is controlled by a switch and that receive electrical power via the power strip. The shelf assembly may further include a second shelf support bracket with male tabs. Preferably the male tabs and female slots are arranged in pairs such that a pair of male tabs mates with a pair of female slots.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 7b is an exploded view of the shelf assembly 70 and shelf support brackets 75a, 75b shown in FIG. 7a;

DESCRIPTIVE KEY 10 adjustable shelving mount with cord organizer
11 television
12 audio/visual equipment
13 decorative item
14 cord
15 household electrical outlet
16 illumination
17 power cord
18 power strip plug
20 mount
21 front plate
22 front plate aperture
23 extension arm
24 front hinge
25 rear hinge
26 rear plate
27 rear plate aperture
30 fastener
35 spine assembly
40 spine frame
41 back plate
42 closure
43 spine aperture
44 spine slot
49 grooved feature
50 spine cover
51 front panel
52 side panel
54 power strip
55a upper connector
55b lower connector
55c intermediate outlet
56 low-voltage outlet
58 knock-out feature
70 shelf assembly
72 shelf panel
75a first shelf support bracket
75b second shelf support bracket
77 locking member
78 tab
90 shelf lighting assembly
91a first light clip
91b second light clip
93 wiring
94 clipping feature
95 lighting junction box
96 light-emitting diode (LED) lamp
97 light switch
98 wire jack
99 light assembly connector
100 stud
105 wall

DETAILED DESCRIPTION OF THE PREFERRED EMBODIMENT

The best mode for carrying out the invention is presented in terms of its preferred embodiment, herein depicted within FIGS. 1 through 9. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
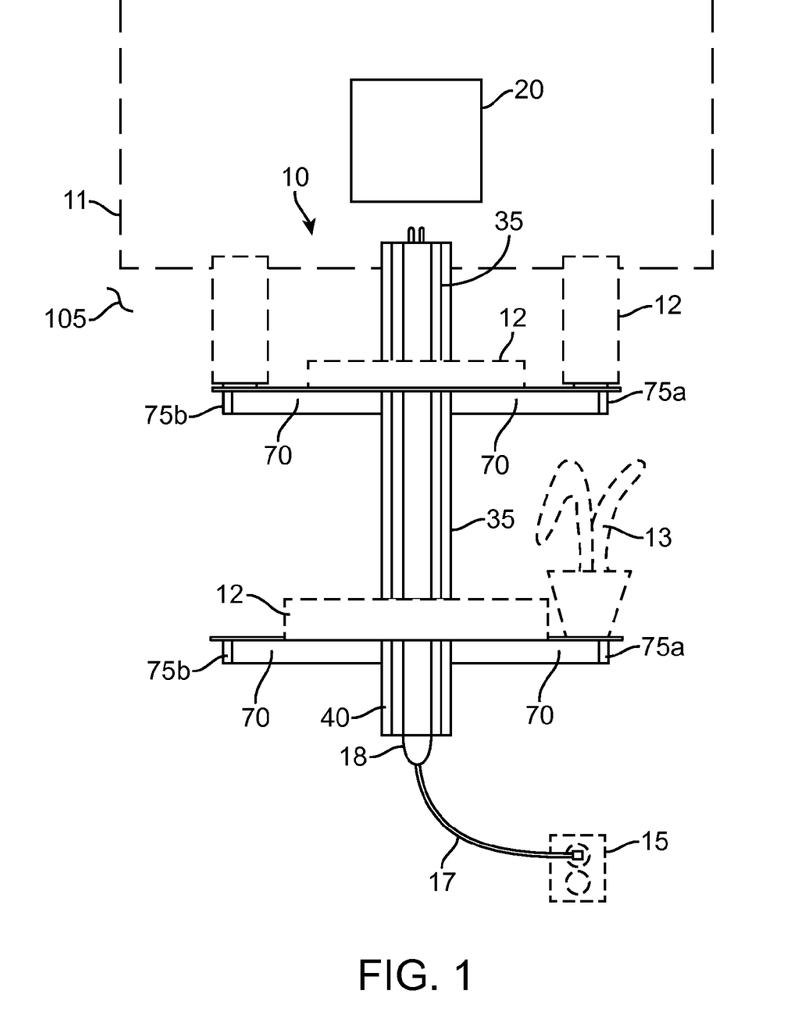
FIG. 1 is an environmental view of an adjustable shelving mount with cord organizer 10 according to a preferred embodiment of the present invention.

Referring now to FIG. 1, an environmental view of an adjustable shelving mount with cord organizer 10 according to a preferred embodiment of the present invention. The adjustable shelving mount with cord organizer 10 conceals unsightly power cords, cables, and wires of an associated wall mounted television 11 and associated audio/visual equipment 12. In addition, the adjustable shelving mount with cord organizer 10 provides attractive and functional shelf panels 72 for supporting the audio/visual equipment 12.

The adjustable shelving mount with cord organizer 10 includes a mount 20 for a television, at least one (1) spine assembly 35 for power distribution and cable/wire organization, and at least one (1) shelf assembly 70. The adjustable shelving mount with cord organizer 10 is configured to be wall 105 mounted while maintaining an orderly appearance about the television 11, audio/visual equipment 12 and decorative items 13. The audio/visual equipment 12 may comprise one (1) or more DVD players, gaming consoles, digital cable boxes, or the like. The decorative items 13 may comprise plants, picture frames, knickknacks, or other items.

The spine assembly 35 of the adjustable shelving mount with cord organizer 10, enables discreet routing of power cords of the television 11, the audio/visual equipment 12, speakers, power sources, and the like behind a central spine cover 50. The spine assembly 35 further includes an internal electrical power strip 54 that enables multiple spine assemblies 35 to be vertically aligned via their respective power strips 54 (reference FIG. 6). Electrical power is supplied to the power strips 54 via a power cord 17 that connects to an existing household electrical outlet 15. The adjustable shelving mount with cord organizer 10 is preferably fabricated from durable metal materials such as steel, yet other equivalent materials may be utilized without limiting the scope of the shelving mount with cord organizer 10.

Figure 8:
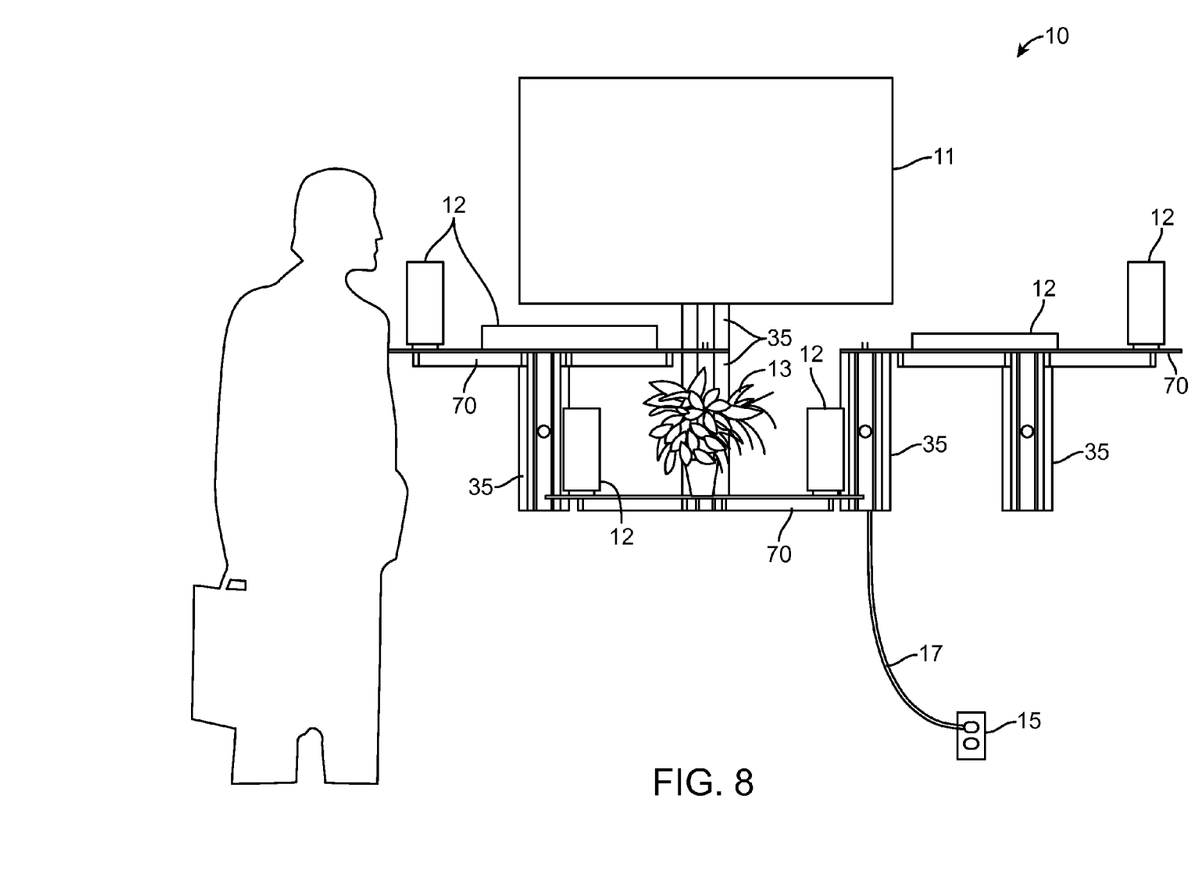
FIG. 8 is an environmental view of the adjustable shelving mount with cord organizer 10 shown in FIG. 1 depicting an arrangement of multiple units; and, FIG. 9 is an electrical block diagram of the adjustable shelving mount with cord organizer 10 shown in FIG. 1.

Still referring to FIG. 1, as shown the adjustable shelving mount with cord organizer 10 includes the mount 20, one (1) or more spine assemblies 35, and a shelf panel 72. However, it should be understood that various quantities and arrangements of the components of the adjustable shelving mount with cord organizer 10 may be combined and arranged in an almost unlimited manner upon the wall 105. As such the specific configuration shown in FIG. 1 should not be interpreted as a limiting factor. For example, FIG. 8 illustrates a different configuration.

Figure 2:
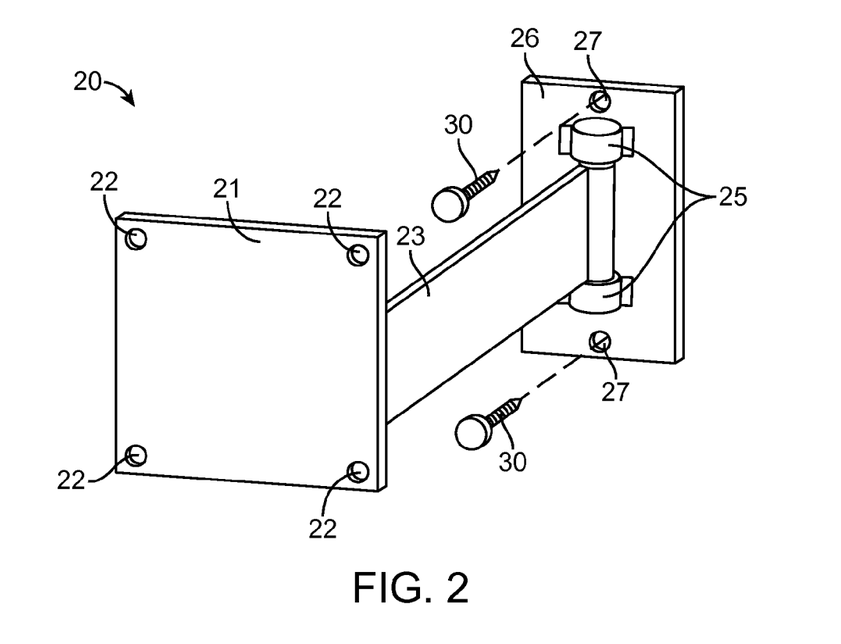
FIG. 2 is a front perspective of a television mount 20 used in the shelving mount with cord organizer 10 shown in FIG. 1.
Figure 3:
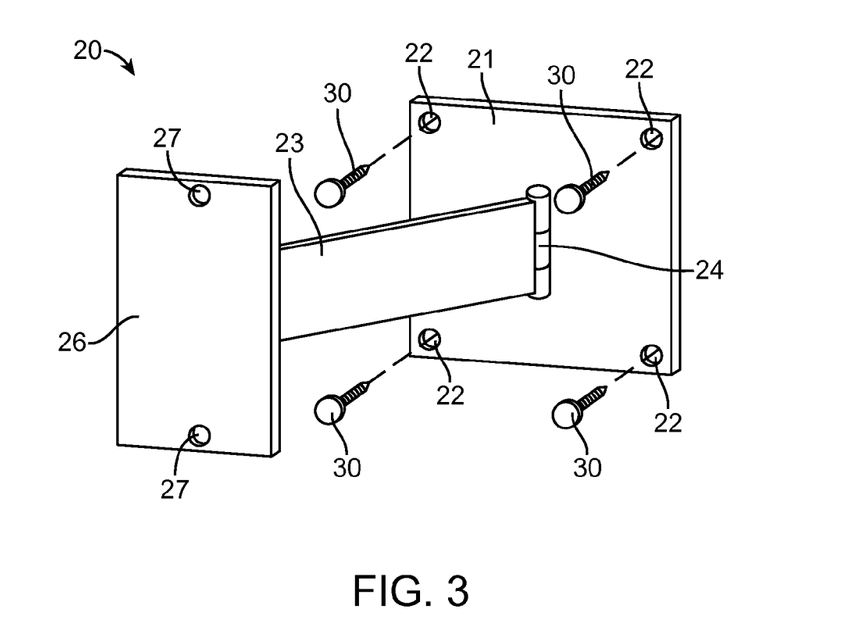
FIG. 3 is a rear perspective view of the television mount 20 shown in FIG. 2.

Refer now to FIGS. 2 and 3, respectively front and rear perspective views of the mount 20 of the adjustable shelving mount with cord organizer 10. The mount 20 enables an existing television 11, preferably a flat panel television, to be mounted on a wall 105 or similar vertical surface. It should be understood that the mount 20 may be manufactured in various dimensions to accommodate various sized televisions 11. The mount 20 comprises a front plate 21 having front plate apertures 22 at each corner. The front plate apertures 22 enable appropriate fasteners 30 to connect to the rear of an existing television 11. Attached to the back of the front plate 21 is an integral vertical front hinge 24 which enables the television 11 to be adjusted side-to-side on an extension arm 23. The extension arm 23 connects the front hinge 24 to a rear hinge 25 on a rear plate 26.

The extension arm 23 is beneficially long enough to position the television 11 a desired distance from the wall 105. The rear hinge 25 enables adjusting the extension arm 23 with respect to the rear plate 26 while the rear plate 26 enables attachment to the mounting wall 105 at the desired height. To that end the rear plate 26 includes a pair of rear plate apertures 27 that are suitable for enabling appropriate fasteners 30 to be used to attach the rear plate onto the wall 105. Preferably the rear plate apertures 27 are configured and spaced to allow alignment with studs 100 within the wall 105. Stud mounting provides the required structural support to hold the television 11 and the other elements.

Figure 4:
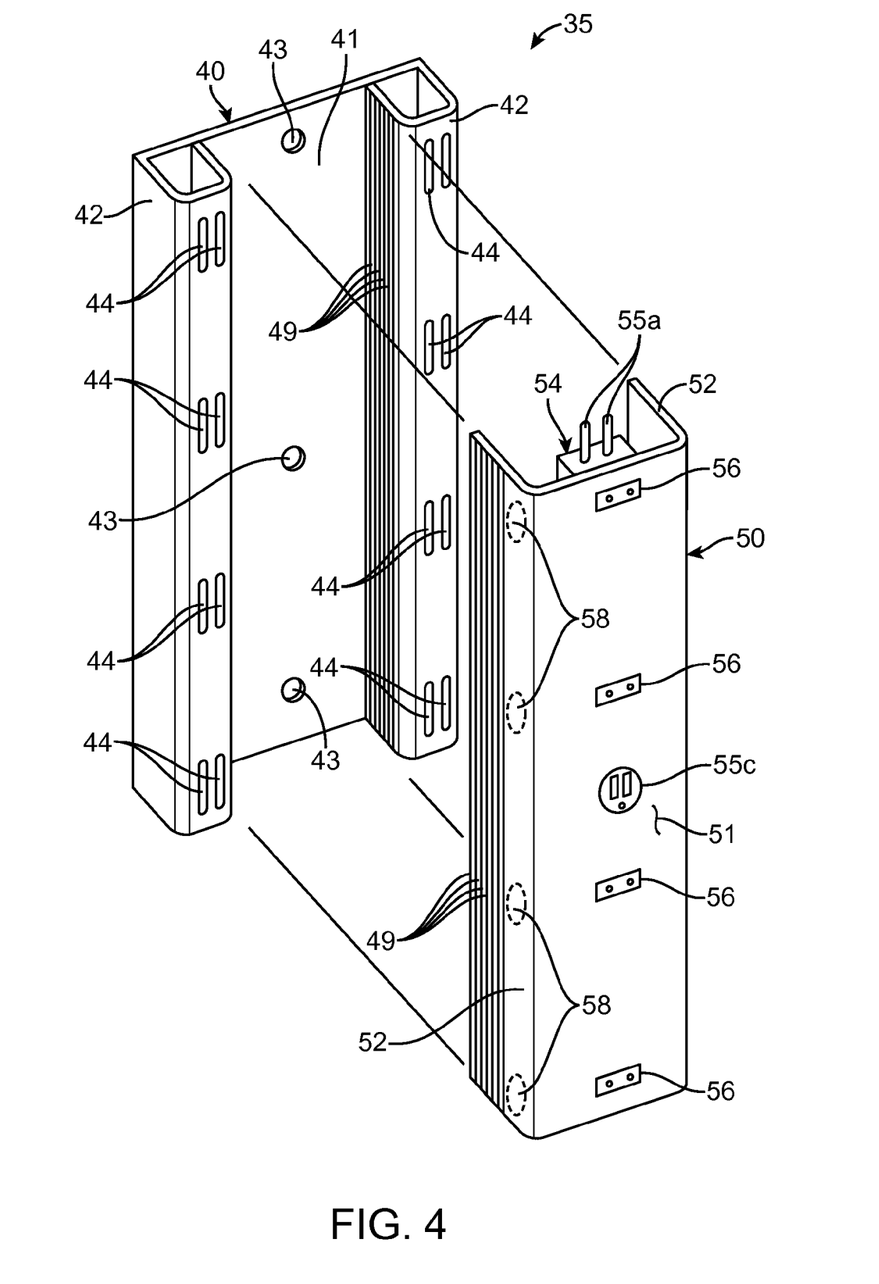
FIG. 4 is an exploded view of a spine assembly 35, its spine frame 40, and its cover 50 used in the shelving mount with cord organizer 10 shown in FIG. 1.
Figure 5:
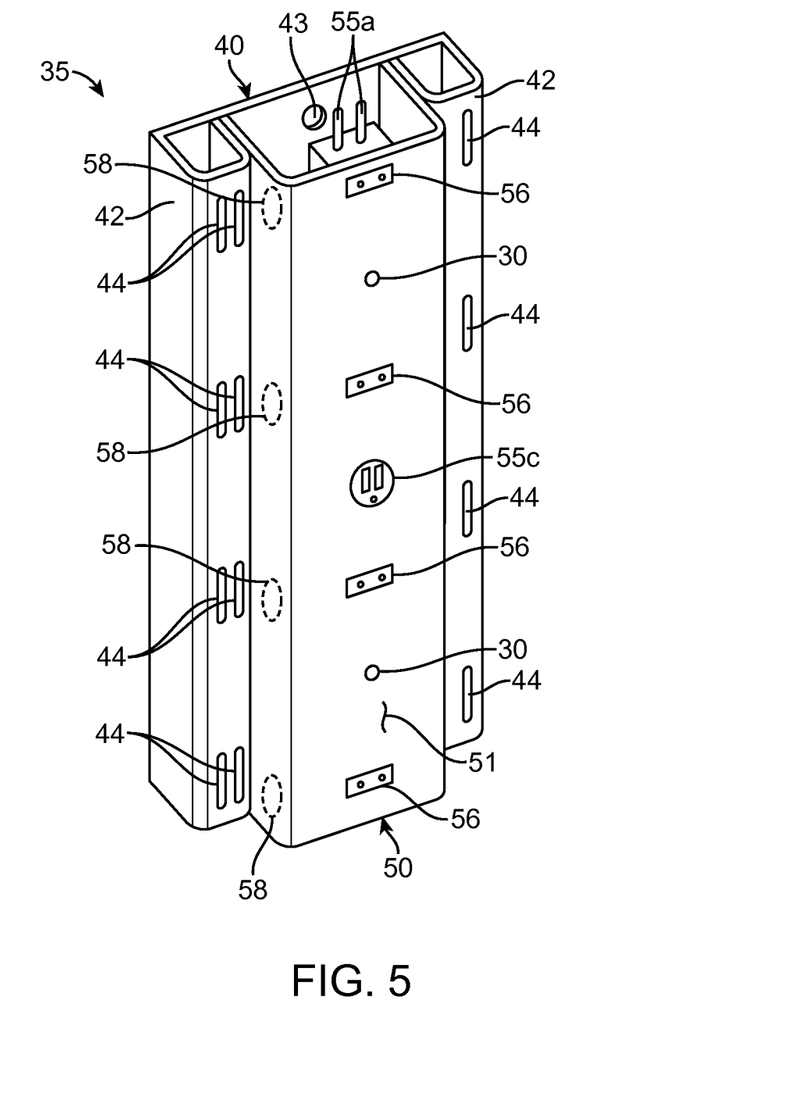
FIG. 5 is a perspective view of the spine assembly 35 shown in FIG. 4 depicted in an assembled state.
Figure 6:
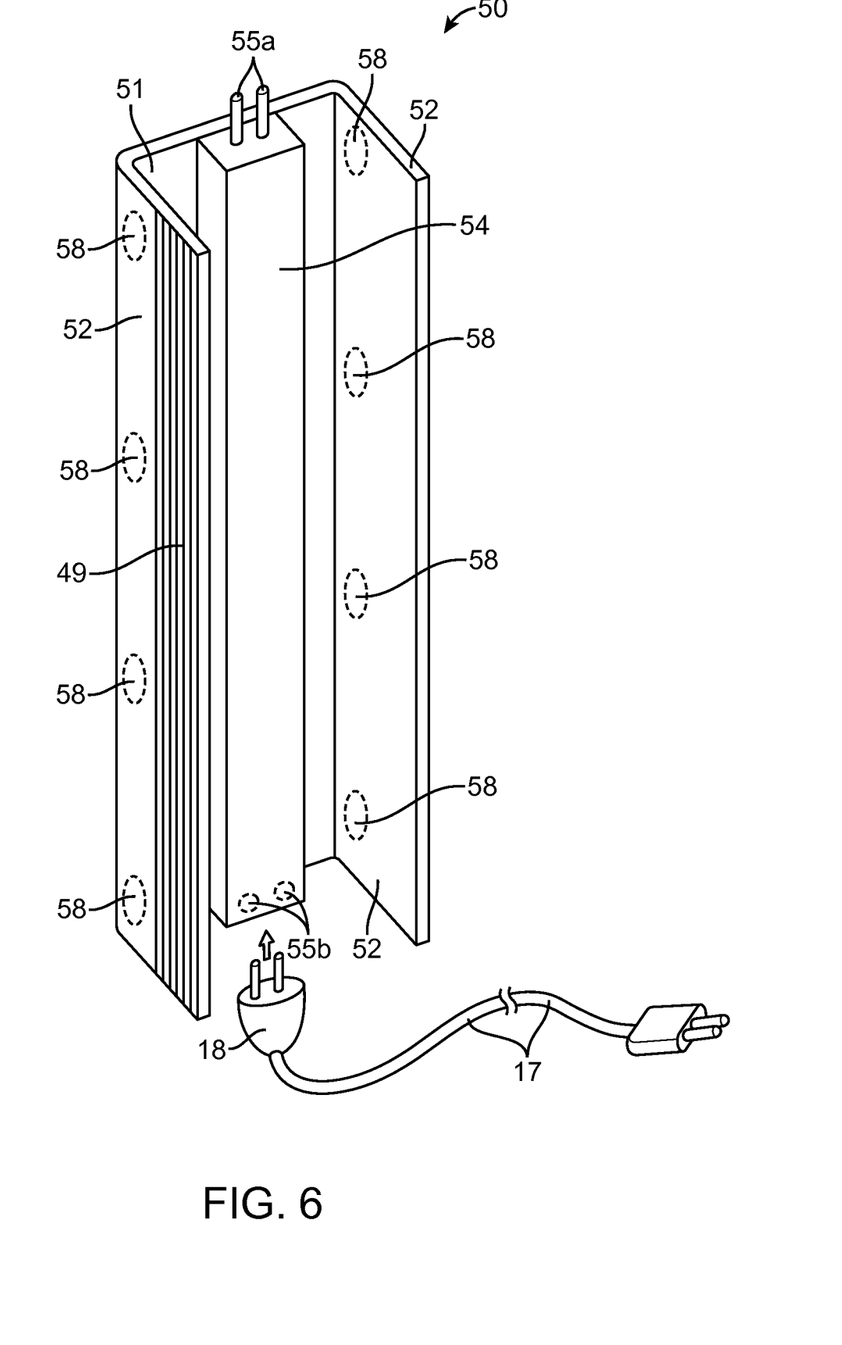
FIG. 6 is a rear perspective view of the cover 50 of the adjustable shelving mount with cord organizer 10 shown in FIG. 1.

Refer now to FIGS. 4 and 5, respectively exploded and assembled views of the spine assembly 35, and to FIG. 6, a rear view of the spine cover 50. Fully assembled the spine assembly 35 is a somewhat "T"-shaped structure having a stationary spine frame 40 and a removable spine cover 50. Those elements enable discreetly routing various interconnecting cords, cables, wires for the television 11 and audio/visual equipment 12, as well as providing for an input power cord 17. The spine assembly 35 is configured to support attachment of a first shelf support bracket 75a, a second shelf support bracket 75b, and a shelf panel 72 (see FIGS. 7a and 7b). The spine assembly 35 is envisioned as being mounted beneath the television mount 20 to create an attractive home entertainment ensemble.

The spine frame 40 enables mounting the adjustable shelving mount with cord organizer 10 onto a desired wall 105, preferably to an existing stud 100 (see FIG. 7a) of the wall 105. The spine frame 40 is elongated vertically and has an overall "U"-shaped cross-section comprised of a flat back plate 41 and a pair of generally rectangular closures 42 that form spine frame walls. In practice, each spine frame 40 measures approximately sixteen inches (16 in.) in length and five inches (5 in.) in width. A user may choose to use a number of spine assemblies 35 to accommodate a particular arrangement of shelf assemblies 70 and entertainment items 11, 12, 13.

The back plate 41 includes a plurality of equally-spaced and vertically arranged spine apertures 43. The spine apertures 43 enable attachment of the spine frame 40 to the wall 105 using fasteners 30 such as wall anchors, screws, or the like. The closures 42 also provide a means to attach and support a shelf assembly 70 via pairs of spine slots 44 that are vertically arranged along a front surface. Each spine slot 44 has an ovular or rectangular shape that is suitable for receiving and securing a mating tab 78 of the shelf assembly 70 (see FIGS. 7a and 7b).

The spine cover 50 is an elongated "U"-shaped structure that houses and retains a full-length power strip 54 that is affixed to an inward-facing center surface using common fasteners 30 such as rivets or the like. The power strip 54 is beneficially a plastic or metal enclosure having power distribution connections that protrude through both the front and end of the spine cover 50. The power distribution connections include an upper connector 55a, a lower connector 55b, an intermediate outlet 55c, and a plurality of low-voltage outlets 56. The upper 55a and lower 55b connectors have respective male and female pins which conduct electricity from one (1) spine assembly 35 to the next. While shown as male and female pins the upper 55a and lower 55b connectors may be any type of conventional electrical connector. The upper 55a and lower 55b connectors also assist vertical alignment of vertically adjacent spine assemblies 35 to form one (1) extended linear assembly.

The intermediate outlet 55c is a forward-facing standard 110-volt outlet for providing power to the audio/visual equipment 12 on the shelf assemblies 70. While the intermediate outlet 55c is shown centrally positioned on the spine cover 50; multiple intermediate outlets 55c in other locations may also be used without limiting the scope of the invention.

The power strip 54 also provides reduced voltage via a plurality of low-voltage outlets 56 that are arranged along the front of the spine cover 50. Each low-voltage outlet 56 enables electrical connections to a shelf lighting assembly 90 of a shelving assembly 70 (see FIGS. 7a and 7b) as is subsequently described.

The spine frame 40 and the spine cover 50 attach via high-friction insertion of the spine cover 50 between the closures 42. The spine cover 50 provides sufficient interior space for routing a plurality of power cords that are concealed by the spine cover 50 and the spine frame 40. The spine cover 50 has a front panel 51 and a pair of opposing side panels 52 that beneficially have a plurality of ovular or rectangular perforated knock-out features 58. The sides of the closures 42 and the side panels 52 both include interlocking vertical grooved features 49. When the spine cover 50 is inserted between the closures 42 the mating surfaces are securely affixed via the interlocking nature of the grooved features 49. This provides a strong spine assembly 35.

The knock-out features 58 are easily removed shapes which once removed, provide an entry and exit for various cords, wires, and/or cables. The knock-out features 58 have sufficient dimensions to allow insertion of plugs.

A power cord 17 is used to interconnect the power strip 54 of the spine cover 50 to an existing household electrical outlet 15 (see FIG. 1). The power cord 17 also connects to a lower connector 55*b* of the spine cover 50 via a male pronged power strip plug 18. This routs AC current from the household electrical outlet 15 into the shelving mount with cord organizer 10. The above mentioned power cord 17 is preferably attached to the bottom-most lower connector 55*b* of the adjustable shelving mount with cord organizer 10.

Figure 7A:
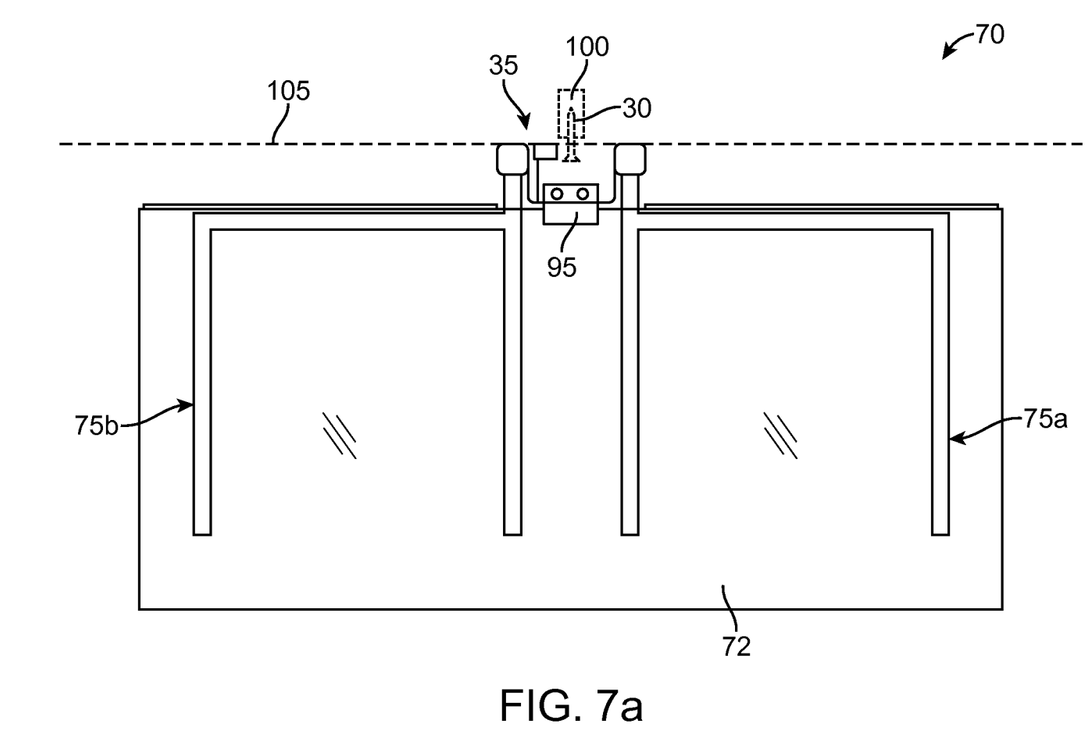
FIG. 7a is a top view of a shelf assembly 70 and shelf support brackets 75a and 75b used in the shelving mount with cord organizer 10 shown in FIG. 1.
Figure 7B:
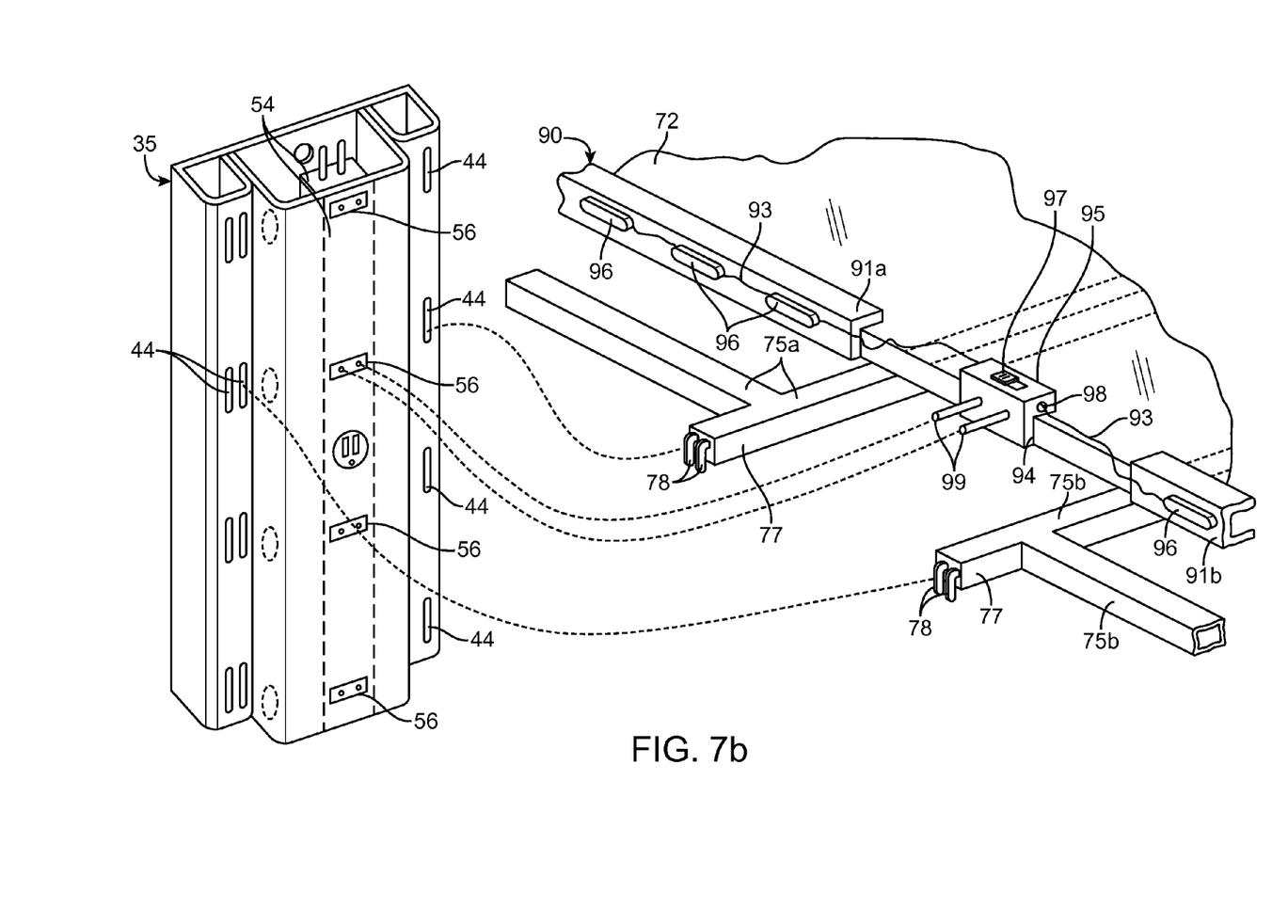

Refer now to FIGS. 7*a* and 7*b*, respectively top and exploded views of a shelf assembly 70. The spine assembly 35 and the spine slot 44 provide attachment for at least one (1) shelf assembly 70 that can be mounted at various vertical positions to provide support for audio/visual equipment 12 and decorative items 13. The shelf assembly 70 includes a shelf panel 72; a first shelf support bracket 75*a*, a second shelf support bracket 75*b*, and a shelf lighting assembly 90 (reference FIG. 9).

The shelf panel 72 is preferably fabricated of a transparent material such as plate glass or acrylic to enable transmission of light from the shelf lighting assembly 90 which is clipped to a rear edge. However, it is to be understood that other materials may be used without limiting the scope of the shelving mount with cord organizer 10. The shelf assembly 70 is envisioned as being approximately twenty-eight inches (28 in.) in length and approximately twelve inches (12 in.) in depth; however, other dimensions and decorative shapes may be utilized without limiting the scope of the invention.

The shelf panel 72 is supported by a right-hand first shelf support bracket 75*a* and a left hand second shelf support bracket 75*b*. The first shelf support bracket 75*a* and the second shelf support bracket 75*b* are attached to the spine assembly 35 in a hooking manner via respective tabs 78 and spine slots 44. The first 75*a* and second 75*b* shelf support brackets form "mirror-image" coplanar horizontal structures comprising a "U"-shaped tubular construction and which attaches onto and extends forward from the spine assembly 35. Each shelf support bracket 75*a*, 75*b* includes an integral rearward-extending locking member 77 that ends with hook-shaped tabs 78. The hook-shaped tabs 78 curve to provide mechanical attachment with the spine slots 44 when inserted. The tabs 78 are arranged in pairs and are spaced and sized to mate with corresponding spine slots 44. The tabs 78 slide into the spine slots and move down. This locks the shelf support bracket 75*a*, 75*b* to the spine assembly 35.

The shelf lighting assembly 90 illuminates the shelf panel 72. The shelf lighting assembly 90 is a three-piece assembly comprised of a first light clip 91*a*, a second light clip 91*b*, and a lighting junction box 95. Each light clip 91*a*, 91*b* is a molded or extruded "U"-shaped plastic-molded or extruded member that is removably attachable to opposing rear edges of the shelf panel 72 via an interference fit. Each light clip 91*a*, 91*b* is approximately twelve inches (12 in.) in length and is dimensioned to securely attach to the shelf panel 72. The light clips 91*a*, 91*b* are envisioned as being transparent and configured to enable adhesive attachment of a plurality of LED lamps 96 along a rear surface. Preferably the LED lamps 96 are equally-spaced and are electrically interconnected using common wiring 93.

Power is supplied to the LED lamps 96 via the lighting junction box 95. The lighting junction box 95 is preferably positioned along the rear of the shelf panel 72 and between the light clips 91*a*, 91*b*. The lighting junction box 95 comprises a rectangular molded body that is configured to include an integral three-sided clipping feature 94. The lighting junction box 95 includes a top-mounted light switch 97, a pair of wire jacks 98, and a pair of light assembly connectors 99.

During attachment of a shelf panel 72 to the spine assembly 35, electrical communication is established between a low-voltage outlet 56 of the spine assembly 35 and the lighting junction box 95 via insertion of male light assembly connectors 99 into the low-voltage outlet 56. In turn, power is conducted through the wire jacks 98 and the wiring 93 to the LED lamps 96. The light switch 97 allows a user to activate the shelf lighting assembly 90 whenever desired.

It should be understood that the shelving mount with cord organizer 10 may be configured without the shelf lighting assembly 90, if desired, thereby providing only the shelving function. The LED lamps 96 are envisioned as conducting light through the entire shelf panel 72 to create an attractive lighting effect. The shelving mount with cord organizer 10 is further envisioned as being introduced such that the desired number of shelf panels 72 and shelf lighting assemblies 90 are purchased separately or as a kit.

FIG. 8 presents an environmental view of the adjustable shelving mount with cord organizer 10 depicting an arrangement of multiple units of the preferred embodiment of the present invention. The adjustable shelving mount with cord organizer 10 may be configured in various ways using a plurality of spine assemblies 35 and attached shelf assemblies 70 to arrange various audio/visual equipment 12, decorative items 13, and a television 11 in an orderly, desired fashion.

Figure 9:
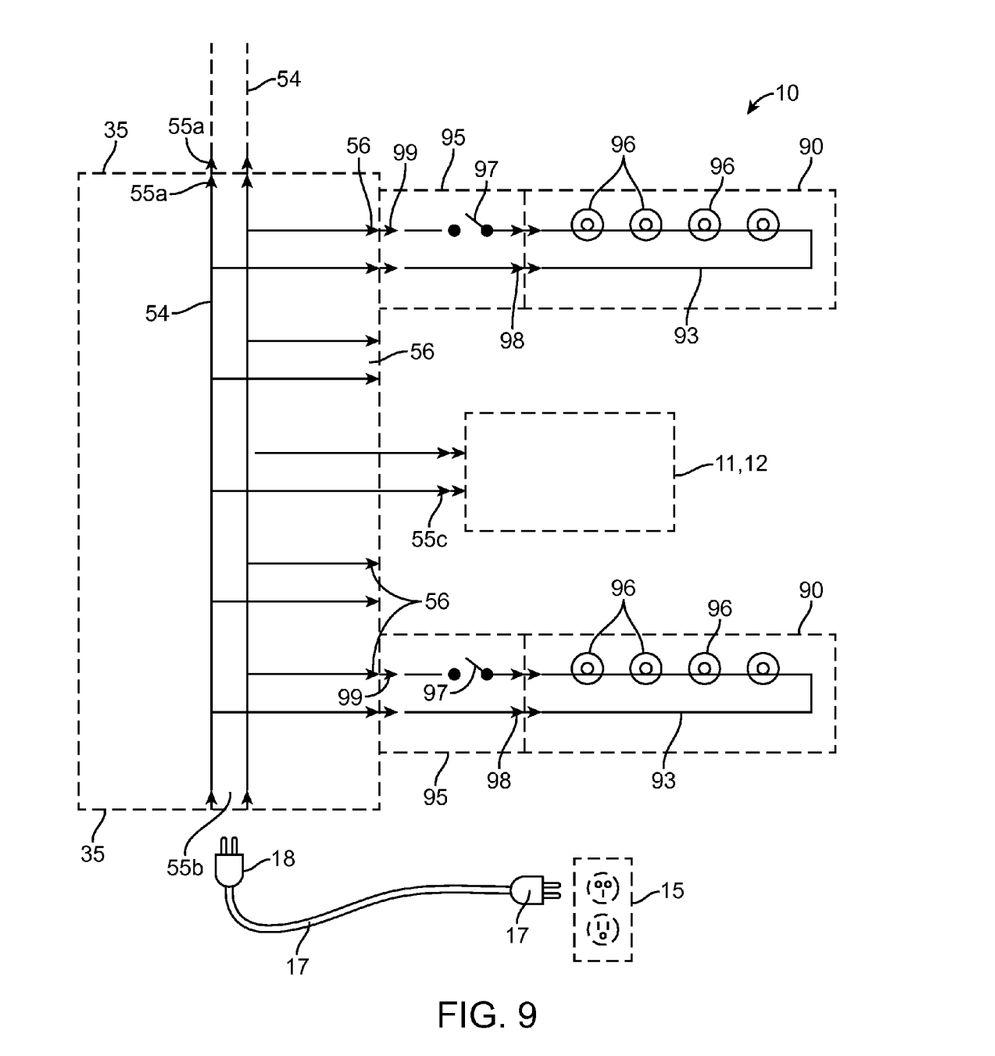

FIG. 9 presents an electrical block diagram of the adjustable shelving mount with cord organizer 10. As shown the electrical block diagram includes the power strip 54 and various power distribution components including the upper connector 55*a*, the lower connector 55*b*, the intermediate outlet 55*c*, and a plurality of low-voltage outlets 56. The upper 55*a* and lower 55*b* connectors conduct electricity between adjacent spine assemblies 35 and a bottom-mounted power cord 17. The intermediate outlet 55*c* comprises a standard 110-volt outlet providing available power to a television 11 and/or various audio/visual equipment 12. The power strip 54 also provides a plurality of low-voltage outlets 56 which enable electrical connection of at least one (1) shelf lighting assembly 90 having a plurality of LED lamps 96.

Power is supplied to the LED lamps 96 via the lighting junction box 95. Each lighting junction box 95 has a light switch 97, a pair of wire jacks 98, and a pair of light assembly connectors 99. Electrical communication is established between the low-voltage outlet 56 and the lighting junction box 95 via insertion of male-style light assembly connectors 99 of the lighting junction box 95 into the male-style low-voltage outlet 56. In turn, power is conducted through the wire jacks 98 and the wiring 93 to the LED lamps 96. The light switch 97 comprises a simple contact closure device which enables a user to activate the shelf lighting assembly 90 when desired.

It is envisioned that other styles and configurations of the present invention can be easily incorporated into the teachings of the present invention. While only one particular configuration has been shown that is for purposes of clarity and disclosure and not by way of limitation of scope.

The preferred embodiment of the present invention can be used by the common user in a simple and effortless manner with little or no training. After initial purchase or acquisition of the adjustable shelving mount with cord organizer 10 it would be installed as indicated in FIG. 1.

The method of installing and using the adjustable shelving mount with cord organizer 10 may be achieved by performing the following steps: acquiring a model of the adjustable shelving mount with cord organizer 10 having a desired number of spine assemblies 35 and shelf assemblies 70; installing a spine frame 40 preferably to a stud 100 within the wall 105 using the spine apertures 43 and common fasteners 30; installing a desired number of additional spine frames 40 in a vertically aligned manner until creating a desired configuration of the adjustable shelving mount with cord organizer 10; installing respective spine covers 50 by coincidentally inserting the grooved feature 49 of the side panel 52 against the corresponding grooved features 49 of the closures 42 while inserting into the upper 55a and lower 55b connectors of the adjacent power strips 54; sliding attaching light clip 91a, 91b and lighting junction box 95 of a shelf lighting assembly 90 onto the rear edge of a shelf panel 72; attaching the shelf lighting assembly 90 to the spine assembly 35 by coincidentally inserting the tabs 78 and light assembly connectors 99 into respective spine slots 44 and low-voltage connectors 56; attaching additional desired shelf panels 72 and shelf lighting assemblies 90, in like manner; installing the television mount 20 to a wall 105 by attaching the rear plate 26 preferably to studs 100 within the wall 105 using appropriate fasteners 30; attaching the front plate 21 of the television mount 20 to an existing television 11; placing various desired audio/visual equipment 12 and/or decorative items 12 upon the shelf panels 72; removing a necessary number of knock-out features 58 to allow routing of cords 14 from the television 11 and audio/visual equipment 12 into the spine covers 50; routing cords out of the knock-out features 58 to access and utilize the intermediate outlets 55c to supply power to the audio/visual equipment 12, as needed; plugging the power strip plug 18 of the power cord 17 into the bottom-most lower connector 55b; inserting the power plug 17 into an available household electrical outlet 15; activating the LED lamp portions 96 of the shelf lighting assembly 90 via respective light switches 97; and, using the shelving mount with cord organizer 10 as desired to allow for the easy wall mounting of a television 11, various desired audio/visual equipment 12, and/or decorative items 13.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An adjustable shelf assembly, comprising:
    a mount having a front plate with a plurality of front plate apertures, a front hinge attached to the back of said front plate, an extension arm pivotally connected to said front hinge, a rear hinge pivotally connected to an end of said extension arm, and a rear plate connected to said rear hinge, said rear plate having at least one rear plate aperture;
    a spine assembly with a "U" shaped frame that defines a back plate and two closures that form frame sidewalls, the spine assembly further includes a "U" shaped mating cover having an internal electrical power strip for distributing electrical power, said spine assembly defining an interior channel, each of said closures including female slots, said power strip including an electrical outlet, and said mating cover including an aperture for enabling access to said electrical outlet; and,
    a shelf assembly having a shelf panel and a first shelf support bracket with male tabs for mating to said shelf assembly to said spine assembly and for supporting said shelf panel;
    wherein said closures each have an interior surface having frame grooves;
    wherein said mating cover includes two frame sidewalls having cover grooves;
    wherein said frame sidewalls includes a plurality of perforated knock-outs;
    wherein said front hinge enables side-to-side adjustment of said extension arm; and,
    wherein an individual one of said tabs mates with an individual one of said slots.

2. The adjustable shelf assembly according to claim 1, wherein said front plate apertures receive fasteners that retain said front plate to a television.

3. The adjustable shelf assembly according to claim 1, wherein said mating cover and frame friction fit together such that said frame grooves and said cover grooves lock together.

4. The adjustable shelf assembly according to claim 1, wherein said power strip provides reduced voltage via a plurality of low-voltage outlets.

5. The adjustable shelf assembly according to claim 1, wherein at least one low-voltage outlet is a female connector.

6. The adjustable shelf assembly according to claim 1, wherein said power strip includes power input pins for receiving electrical power.

7. The adjustable shelf assembly according to claim 6, wherein said power strip further includes power outlet pins for mating with said power input pins such that a plurality of power strips can be connected together.

8. The adjustable shelf assembly according to claim 7, wherein said power outlet pins and said power input pins are aligned to enable forming an extended linear assembly.

9. The adjustable shelf assembly according to claim 1, wherein said power strip includes a standard 110 volt outlet plug.

10. The adjustable shelf assembly according to claim 1, wherein said frame includes at least one frame aperture to mount said spine assembly to a wall.

11. The adjustable shelf assembly according to claim 1, wherein said shelf assembly further includes a plurality of lights.

12. The adjustable shelf assembly according to claim 11, wherein said shelf panel is transparent and said plurality of lights attach to said shelf panel.

13. The adjustable shelf assembly according to claim 11, wherein said shelf panel is transparent and said plurality of lights attach to said shelf assembly such that emitted light passes through said shelf panel.

14. The adjustable shelf assembly according to claim 13, wherein said plurality of lights include plurality of light emitting diodes.

15. The adjustable shelf assembly according to claim 14, wherein illumination from said plurality of light emitting diodes is controlled by a switch.

16. The adjustable shelf assembly according to claim 15, wherein said plurality of light emitting diodes receive electrical power from said power strip.

17. The adjustable shelf assembly according to claim 1, wherein said shelf assembly further includes a second shelf support bracket with male tabs for mating said shelf assembly to said spine assembly and for supporting said shelf panel.

18. The adjustable shelf assembly according to claim 15, wherein said male tabs are arranged in pairs, said female slots are arranged in pairs, and wherein a pair of male tabs mates with a pair of female slots.

* * * * *